(12) United States Patent
Platt

(10) Patent No.: US 7,374,154 B2
(45) Date of Patent: May 20, 2008

(54) MOUNTING SYSTEM FOR MOUNTING A RAIL TO A POST

(76) Inventor: Robert E. Platt, 8701 Highland Ave., Mineral Ridge, OH (US) 44440

(*) Notice: Subject to any disclaimer, the term of this patent is extended or adjusted under 35 U.S.C. 154(b) by 352 days.

(21) Appl. No.: 11/148,091

(22) Filed: Jun. 8, 2005

(65) Prior Publication Data

US 2005/0236612 A1 Oct. 27, 2005

Related U.S. Application Data

(63) Continuation-in-part of application No. 10/246,285, filed on Sep. 18, 2002, now Pat. No. 6,986,505, which is a continuation-in-part of application No. 10/056,719, filed on Jan. 24, 2002, now Pat. No. 6,698,726.

(51) Int. Cl.
*E04H 17/00* (2006.01)

(52) U.S. Cl. .............. 256/65.01; 256/65.02; 403/187; 403/192

(58) Field of Classification Search .......... 256/1, 256/19, 59, 65.01, 66, 65.02, 67, 69, 65.05, 256/65.12, DIG. 2; 403/375, 234, 27, 82, 403/87, 332, 121, 187, 192; 248/251, 286, 248/291; 16/237, 224, 335, 362
See application file for complete search history.

(56) References Cited

U.S. PATENT DOCUMENTS 2,636,273 A 4/1953 Morris
3,589,681 A 6/1971 Ackerman
4,150,907 A * 4/1979 Thurnauer ............... 403/234
4,621,782 A * 11/1986 Carlson et al. ........ 248/183.3
4,767,232 A * 8/1988 Francis .................... 403/91
5,026,028 A * 6/1991 Ooi et al. .................. 256/67
5,320,322 A * 6/1994 Williams ................. 248/514
5,437,433 A * 8/1995 Rezek ....................... 256/67
5,734,356 A 3/1998 Chang
5,788,224 A * 8/1998 Platt ......................... 256/66
6,061,921 A 5/2000 Adams et al.
6,082,019 A * 7/2000 Lapp et al. ................ 33/760
D432,928 S 10/2000 Garrett
6,308,937 B1 * 10/2001 Pettit ..................... 256/65.05
6,314,652 B1 11/2001 English
6,445,361 B2 * 9/2002 Liu et al. .................. 343/882
6,470,578 B1 10/2002 Phuly et al.

* cited by examiner

Primary Examiner—Daniel P. Stodola
Assistant Examiner—Nahid Amiri
(74) Attorney, Agent, or Firm—Sand & Sebolt

(57) ABSTRACT

A fence rail clip for attaching a fence rail to a vertical fence. The rail clip has a base with a raised central area flanked by two lateral areas and a rail connector that, vertically or horizontally, slidingly engages the central area of the base. The lateral areas include apertures through which fasteners are inserted to connect the clip to the fence post. A cover snap-fits over each lateral area to hide the fasteners and give the rail clip a clean and aesthetically pleasing appearance.

20 Claims, 5 Drawing Sheets

MOUNTING SYSTEM FOR MOUNTING A RAIL TO A POST

CROSS-REFERENCE TO RELATED APPLICATION

This is a continuation-in-part of U.S. patent application Ser. No. 10/246,285, filed Sep. 18, 2002, now U.S. Pat. No. 6,986,505, issued Jan. 17, 2006, which application is a continuation-in-part of U.S. patent application Ser. No. 10,1056,719, filed Jan. 24, 2002, now U.S. Pat. No. 6,698,726 issued on Mar. 2, 2004; the entire specifications of which are incorporated herein by reference.

BACKGROUND OF THE INVENTION

1. Technical Field

This invention generally relates to connectors. More particularly, the invention relates to fence rail clips which are used to connect vinyl fence rails and fence posts together. Specifically, the invention relates to an adjustable clip that is mounted onto a fence post and includes covers to hide the mounting mechanism.

2. Background Information

It has recently become more common to use either vinyl or plastic products for constructing fences and deck railings. While vinyl fencing is aesthetically pleasing and easy to maintain, it is more difficult to connect together than wood. One of the more problematic areas is the connection between rails and vertical fence posts. The instant inventor has proposed a novel adjustable connector for joining fence rails to fence posts in the previously filed applications referenced above. In these previous applications two mechanisms have been disclosed for securing the rail clip to the fence post. The first mechanism comprised a bracket which is secured to the fence post and a rail clip having a complementary sized and shaped recess formed in its rear surface and being slidably engageable with the bracket mounted on the post. The second connector mechanism proposed by the instant inventor was the provision of lateral areas on the rail clip which included slots having apertures formed in them. Screws were inserted through the apertures and into the fence post. This second connector mechanism works well to secure the rail clip to the post but, because the screws are visible, the overall appearance of the connection was not entirely aesthetically pleasing.

There is therefore a need in the art for an improved rail clip for attaching fence rails to fence posts and which presents a clean and finished appearance without the mounting mechanism for the clip on the post being visible.

SUMMARY OF THE PRESENT INVENTION

A fence rail clip for attaching a fence rail to a vertical fence post. The rail clip has a base with a raised central area flanked by two lateral areas and a rail connector that, vertically or horizontally, slidingly engages the central area of the base. The lateral areas include apertures through which fasteners are inserted to connect the clip to the fence post. A cover snap-fits over each lateral area to hide the fasteners and give the rail clip a clean and aesthetically pleasing appearance.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
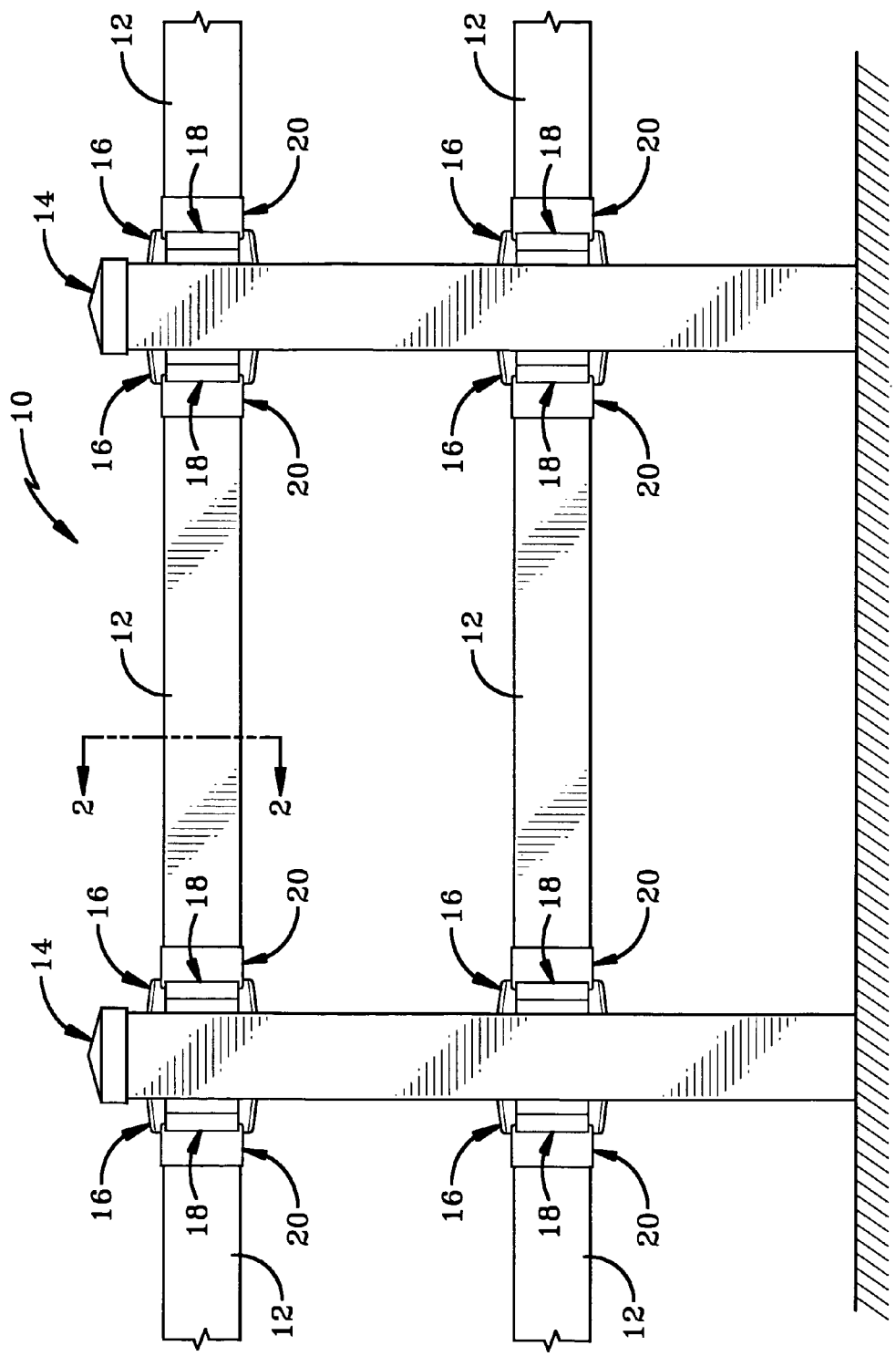
FIG. 1 is a front elevational view of a fence constructed using the rail clip of the present invention.

Referring to FIG. 1 there is shown a fence, generally indicated at 10, constructed from a plurality of rails 12 and posts 14 connected together by rail clips 16 in accordance with the present invention. While fence 10 is shown with rails 12 being secured substantially at right angles to posts 14, it will be understood that rail clips 16 allow the position of a rail to be slidably adjusted on clip 16 and consequently rails 12 can be secured to posts 14 at any desired angle.

Figure 4:
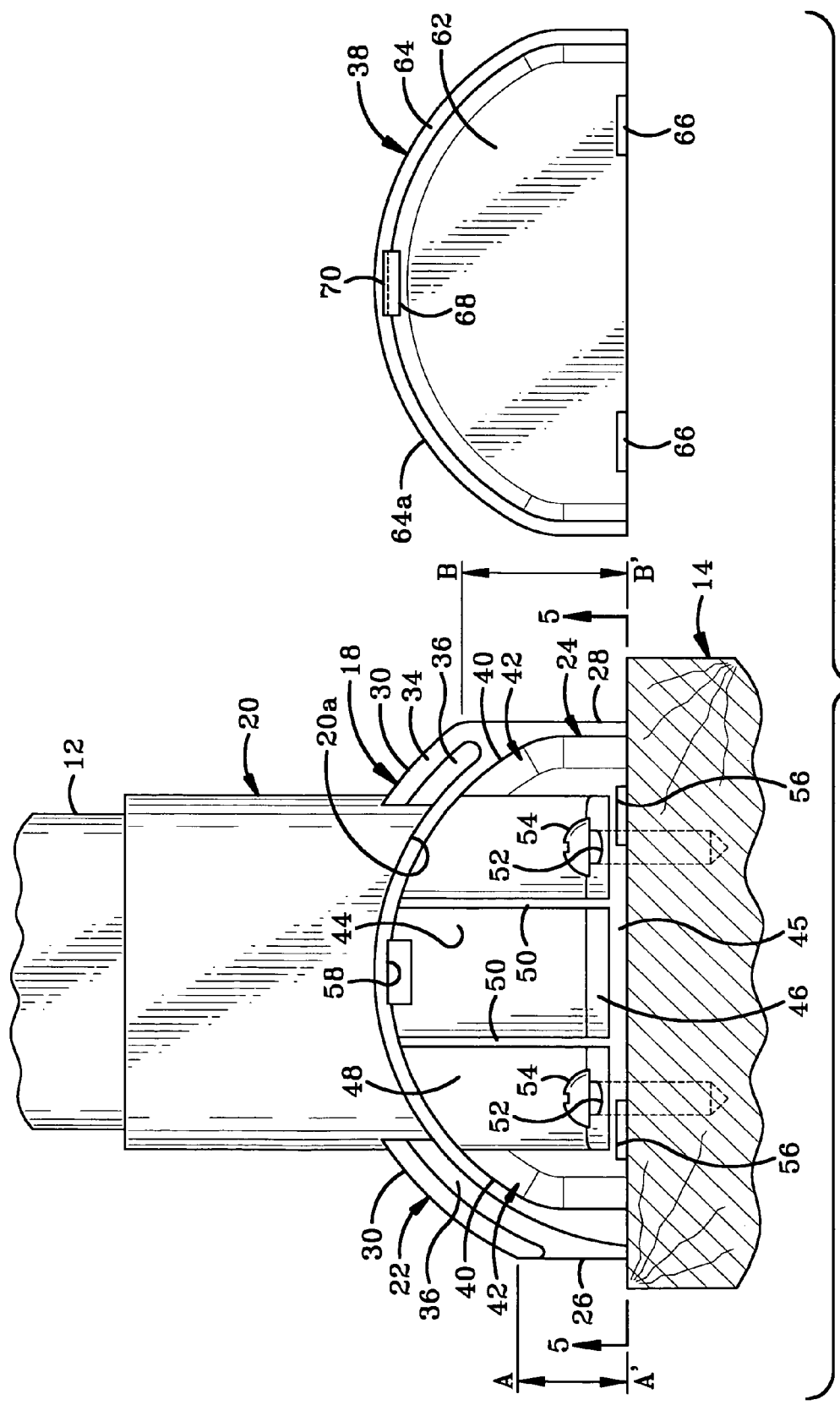
FIG. 4 is a bottom view of the rail clip through line 4-4 of FIG. 3.

Referring to FIGS. 2-5, clip 16 comprises a base 18 and rail connector 20. Base 18 preferably is a single, molded piece that is generally rectangular when viewed from the front (FIG. 3) and is generally semi-circular when viewed from the top or bottom (FIG. 4). Base 18 comprises a central area 22 flanked by lateral areas 24. Central area 22 has first and second planar walls 26, 28 connected together by an arcuate outer wall 30. First planar wall 26 has a length A-A' (FIG. 4) and second planar wall 28 has a length B-B' with length A-A' preferably being shorter than length B-B'. Central area 22 extends outwardly beyond lateral areas 24 thereby forming side walls 34 and a semi-circular groove 36 is cut into each side wall 34. Rail connector 20 engages in groove 36, allowing connector 20 to slide along outer wall 30 and allowing the position of rail connector 20 to be adjusted. The interlocking connection of rail connector 20 and base 18 has been previously described in U.S. patent application Ser. No. 10/246,285 and U.S. Pat. No. 6,698,726 issued to the present inventor and the entire specifications of these two documents are incorporated herein by reference.

In accordance with one of the specific features of the present invention, a cover 38 is provided for each lateral area 24. Each lateral area 24 has an outer wall 40 which extends outwardly from side walls 34 of central area 22 and is substantially semi-circular when viewed from the bottom (FIG. 4). Outer wall 40 broadens to form shoulders 42 that flank a recessed area 44 (FIG. 3) and terminates in an outer edge 45 that lies substantially parallel to side wall 34. Recessed area 44 has a bottom wall 46 and an interior wall 48 (FIG. 4) which extends upwardly therefrom. Interior wall 48 lies substantially parallel to side wall 34 of central area 22. A pair of ribs 50 extend outwardly from bottom wall 46 and terminate at outer wall 40. As may be seen from FIGS. 4 & 5, apertures 52 are formed in bottom wall 46 and fasteners 54 are inserted therethrough to secure clip 16 to post 14. First slots 56 are formed in the underside of bottom wall 46 and at least one second slot 58 is formed in the interior wall 48 of each lateral area 24. Second slot 58 extends into an interior cavity 60 of central area 22.

Figure 5:
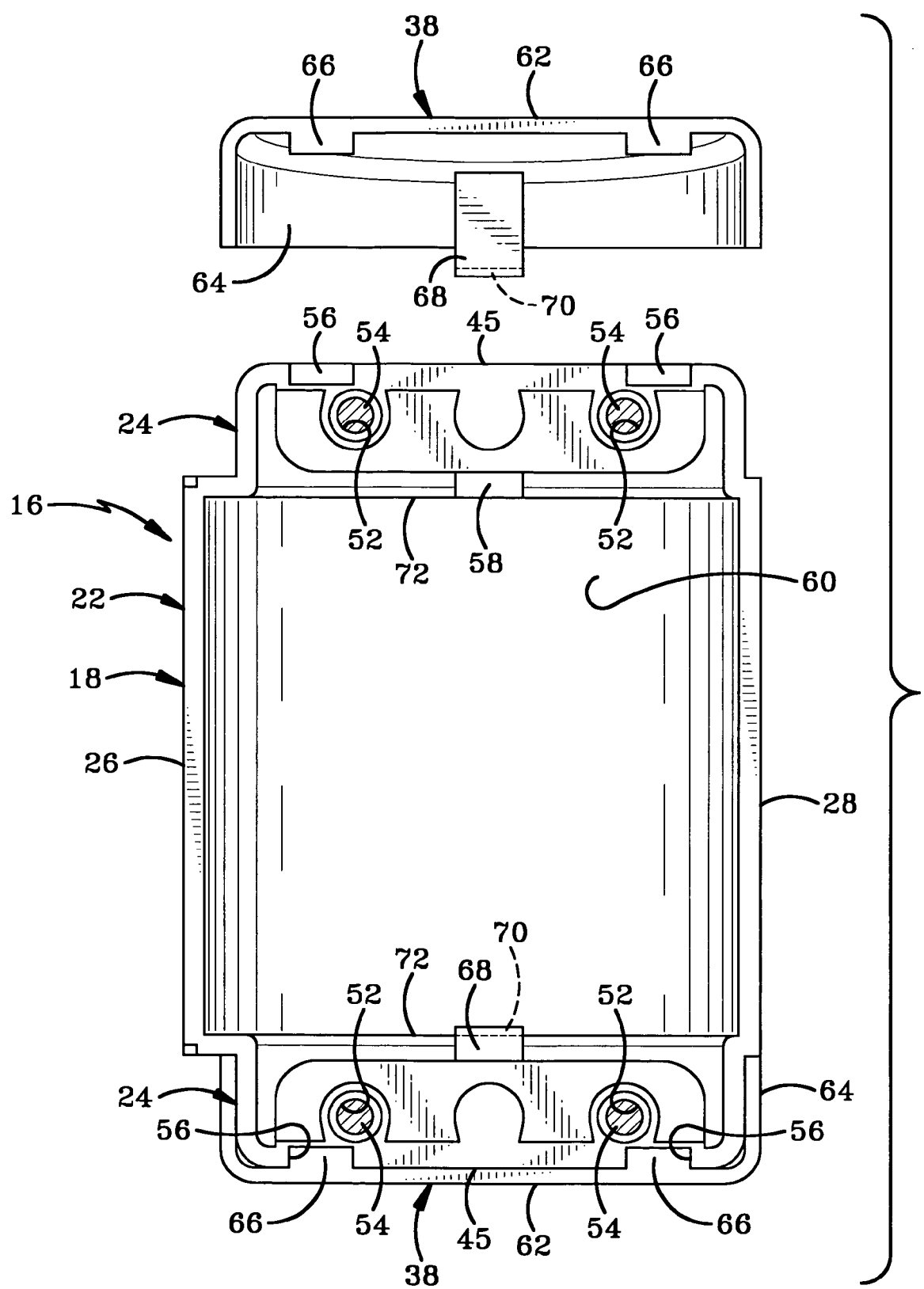
FIG. 5 is a rear view of the rail clip through line 5-5 of FIG. 4.

Each cover 38 is received over outer wall 40 and snap fits into place over lateral area 24 as will be hereinafter described. Cover 38 is substantially C-shaped (FIG. 4) and includes a rear wall 62 with has an arcuate wall 64 extending outwardly therefrom. Arcuate wall 64 is complementary sized and shaped to abut outer wall 40 of lateral area 24. A pair of tabs 66 (FIG. 5) extend inwardly from the base of rear wall 62 and are positioned to be received within first slots 56 of lateral areas 24. Tabs 66 are complementary in size and shape to first slots 56. A detent 68 extends inwardly from the underside of arcuate wall 64 of cover 38 and is positioned to be received within second slot 58 of rail clip 16. Detent 68 preferably includes a lip 70 which extends upwardly toward arcuate wall 64 and interlocks with the interior side wall 72 of clip 16 (FIG. 5). The positioning and the sizes of tabs 66 and detent 68 and the presence of lip 70 allow cover 38 to be snap-fitted over lateral area 24. The lip 70 on detent 68 also prevents easy removal of cover 38 from lateral area 24.

Figure 2:
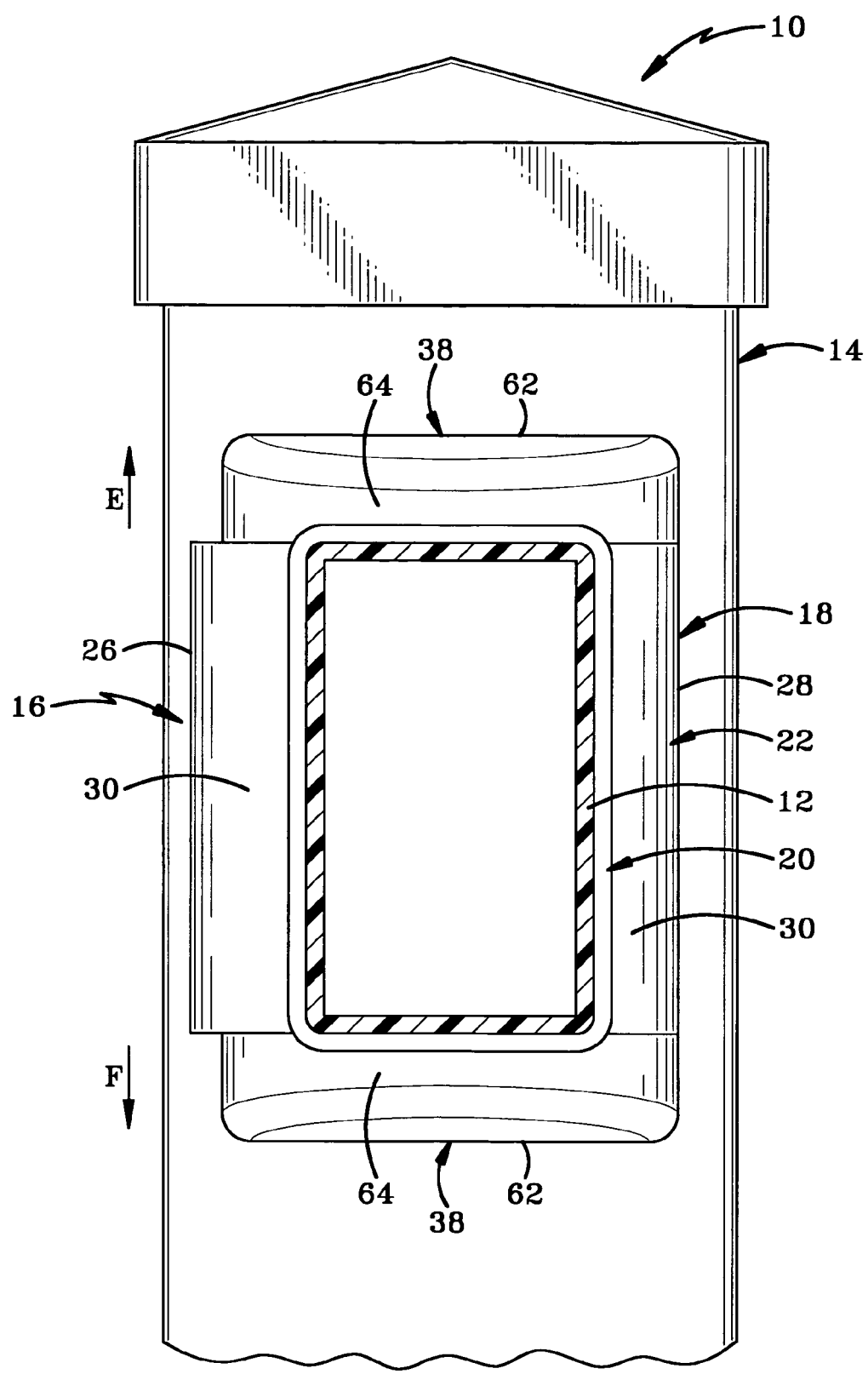
FIG. 2 is a partial cross-sectional front view of the rail clip mounted on the fence post through line 2-2 of FIG. 1; showing the covers attached to the rail clip and the rail projecting out of the rail clip.
Figure 3:
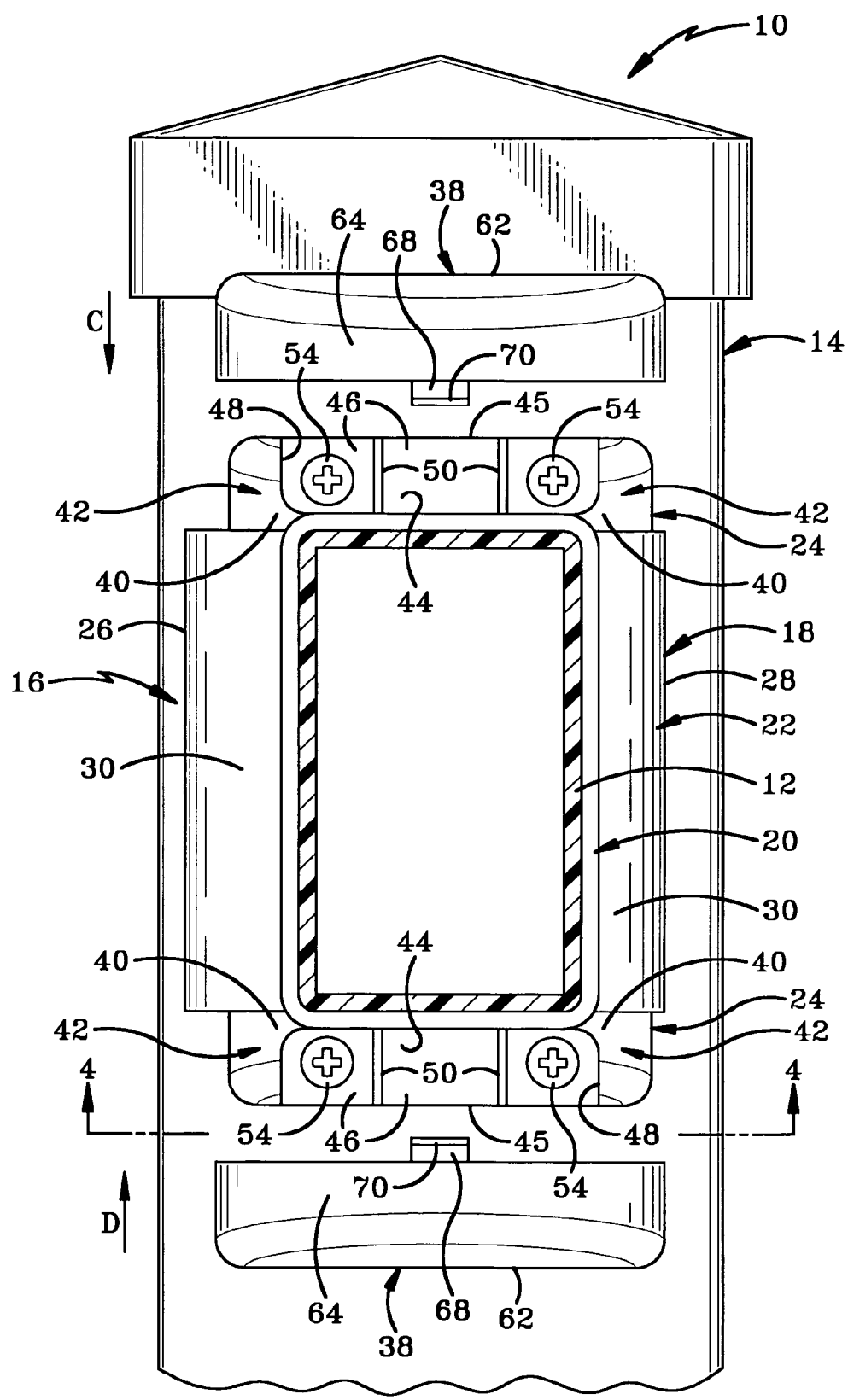
FIG. 3 is a partial cross-sectional front view of the rail clip of FIG. 2 with the cover removed.

The present invention is used in the following manner. The rail clip 16 is positioned against the post 14 in the manner shown in FIG. 4. Fasteners 54 are inserted through apertures 52 and are screwed into post 14. A cover 38 is then moved laterally, in the direction of Arrows "C" and "D" respectively (FIG. 3) over the outer wall 40 of the corresponding lateral area 24. The underside of arcuate wall 64 of the cover 38 abuts outer wall 40 and shoulders 42 of lateral area 24. Cover 38 is slid inwardly over outer wall 40 and shoulders 42 toward central area 22 until detent 68 slides through second slot 58 in interior wall 48 and tabs 66 are received in first slots 56. As cover 38 continues to be moved inwardly, detent 68 deflects slightly downwardly as lip 70 slides into second slot 58 and then into interior cavity 60 of rail clip 16. Lip 70 slides out of second slot 58 and into cavity 60 and springs upwardly and into abutting contact with interior side wall 72 of clip 16. In this position, cover 38 is locked or snap-fitted onto rail clip 16. In this position, cover 38 hides fasteners 54, ribs 50 and all other features of lateral area 24. Clip 16 therefore presents an aesthetically appealing outer surface as is shown in FIG. 2 with no connection mechanism between clip 16 and post 14 being visible. When rail connector 20 is engaged in groove 36 and the position of rail connector 20 is slidably adjusted on the arcuate outer wall 30 of central area 22, the inner edge 20a (FIG. 4) of rail connector 20 rides along the outer surface 64a of arcuate wall 64 of cover 38.

If the user desires to remove clip 16 from post 14 or to simply tighten fasteners 54, the user grasps cover 38 and pulls cover 38 outwardly away from central area 22 (as is indicated by the Arrows "E" and "F" respectively in FIG. 2), rotating cover 38 slightly upwardly as he does so. This causes lip 70 of detent 68 to disengage from interior side wall 72 of clip 16 and detent 68 slides out of second slot 58. At the same time, tabs 66 slide out of first slots 56 and cover 38 slides off outer wall 40 of lateral areas 24. The user can then loosen or tighten fasteners 54 as desired and then, if required, covers 38 can be snap-fitted to rail clip 16 again in the manner previously described.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A rail clip for attaching a rail to a post, the rail clip comprising:
   a base adapted to be mounted on the post, the base comprising:
      a central area having a groove;
      a pair of lateral areas flanking the central area; each of the lateral areas having a back wall that is adapted to abut the post;
      at least one aperture defined in each of the back walls of each of the lateral areas; each aperture being adapted to receive a fastener therethrough to directly secure the back wall to the post;
      a pair of covers; each of the covers being engageable with one of the lateral areas of the base;
   a rail connector adjustably engages the groove of the central area of the base and intermediate the lateral areas; and
   a rail receiving area formed on the rail connector and adapted to retain an end of the rail.

2. The rail clip as defined in claim 1, wherein each of the lateral areas includes a substantially arcuate outer wall and the cover includes a complementary sized and shaped outer wall; and
   the outer wall of the cover abuts the outer wall of the lateral area when the cover and lateral area are engaged.

3. The rail clip as defined in claim 2; wherein each of the covers includes a rear wall which extends downwardly from the cover's outer wall and the rear wall abuts an outer edge of the lateral area when the cover and lateral area are engaged.

4. A rail clip for attaching a rail to a post, the rail clip comprising:
   a base adapted to be mounted on the post, the base comprising:
      a central area having a groove;
      a pair of lateral areas flanking the central area; each of the lateral areas being adapted to receive a fastener to secure the base to the post;
      a pair of covers; each of the covers being engageable with one of the lateral areas; wherein each of the lateral areas includes a substantially arcuate outer wall and each of the covers includes a complementary sized and shaped outer wall; and the outer wall of each cover abuts the outer wall of one of the lateral areas when the covers and lateral areas are engaged; and wherein each of the covers includes a rear wall which extends downwardly from that cover's outer wall and the rear wall abuts an outer edge of one of the lateral areas when the covers and lateral areas are engaged; and wherein the rear wall of each of the covers has a bottom edge and at least one tab extends inwardly from the rear wall proximate the bottom edge thereof;
   a rail connector adjustably engages the groove of the central area of the base; and
   a rail receiving area formed on the rail connector and adapted to retain an end of the rail.

5. The rail clip as defined in claim 4, wherein each lateral area includes a back wall and at least one slot is formed in said back wall; said slot being complementary sized, shaped and positioned to receive the tab that extends from the cover.

6. The rail clip as defined in claim 5, wherein the back wall of each of the lateral areas includes at least one aperture adapted to receive the fastener therethrough.

7. The rail clip as defined in claim 6, wherein each cover further includes a detent extending outwardly from the outer wall of the cover and away from the rear wall thereof.

8. The rail clip as defined in claim 7, wherein each of the lateral areas has an interior wall disposed proximate the central area of the base; and a second slot is formed in the interior wall of the lateral area, said second slot being positioned to receive the detent extending outwardly from the cover.

9. The rail clip as defined in claim 8, wherein the detent includes a lip and when the lip extends through the second slot, the lip engages an interior surface of the rail clip and locks the rail clip and cover together.

10. The rail clip as defined in claim 9, wherein the rail connector engages in a groove formed on an exterior surface of the central area and the rail connector is slidably adjustable along the groove to change the position of the rail connector on the central area; and wherein said rail connector includes an inner edge that slides along an outer surface of the outer wall of the cover when the cover is engaged over the lateral area.

11. The rail clip as defined in claim 10, wherein the detent extends outwardly from an interior surface of the outer wall of the cover.

12. The rail clip as defined in claim 11, wherein the second slot is formed in the interior wall positioned below the groove in the central area.

13. The rail clip as defined in claim 12, wherein each of the lateral areas further includes at least one rib extending upwardly from an interior surface of the back wall and terminating at the outer wall of the lateral area.

14. The rail clip as defined in claim 13, wherein the second slot is formed proximate the termination of the rib.

15. The rail clip as defined in claim 14, wherein the arcuate outer wall of each of the lateral areas includes a narrow portion proximate the second slot and the narrow portion is flanked by wider shoulders.

16. In combination:
a fence post;
an elongated rail;
a rail clip for connecting the rail to the fence post; said rail clip comprising:
 a base having:
  a central area having a groove;
  a pair of lateral areas flanking the central area; each of said lateral areas including a back wall that abuts the fence post:
  at least one aperture defined in each of the back walls of each of the lateral areas;
 a fastener insertable through each of the apertures to secure each of the back walls of each of the lateral areas to the post;
 a pair of covers; each cover being snap-fit over one of the lateral areas of the base;
 a rail connector adjustably engages the groove of the central area of the base and intermediate the lateral areas; and
 a rail receiving area formed on the rail connector; whereby an end of the rail is retained thereby.

17. The combination of claim 16, wherein each of the covers includes an arcuate outer wall and each lateral area includes an arcuate outer wall; and wherein an inner surface of the cover outer wall abuts an outer surface of the lateral area outer wall when the cover and lateral area are engaged.

18. In combination:
a fence post;
an elongated rail;
a rail clip for connecting the rail to the fence post; said rail clip comprising:
 a base having:
  a central area having a groove;
  a pair of lateral areas flanking the central area; each of said lateral areas including at least one aperture in a bottom wall thereof;
 fasteners insertable through the apertures in the lateral areas to secure the base to the post:
 a pair of covers; each cover being snap-fit over one of the lateral areas of the base; wherein each cover includes an arcuate outer wall and each lateral area includes an arcuate outer wall; and wherein an inner surface of the cover outer wall abuts an outer surface of the lateral area outer wall when the cover and lateral area are engaged; wherein each of the covers includes a rear wall which extends downwardly from the outer wall of each of the covers and the rear wall abuts an outer edge of the lateral area when each of the covers and each of the lateral areas are engaged; and wherein at least one tab extends inwardly from the rear wall and engages in at least one slot formed in the back wall of the lateral area;
 a rail connector adjustably engages the groove of the central area of the base; and
 a rail receiving area formed on the rail connector: whereby an end of the rail is retained thereby.

19. The combination of claim 18, wherein each cover further comprises a detent which extends outwardly from the outer wall thereof, and the detent is receivable within a second slot formed in an interior wall of the lateral area.

20. The combination of claim 19, wherein each detent further comprises a lip which engages an interior surface of the rail clip when the detent is received through the second slot in the interior wall, thereby locking the cover and lateral area together.

* * * * *